(12) United States Patent
Wersland et al.

(10) Patent No.: US 10,557,490 B2
(45) Date of Patent: Feb. 11, 2020

(54) TREATMENT ELEMENT ATTACHMENT SYSTEM

(71) Applicant: TheraGun, LLC, Beverly Hills, CA (US)

(72) Inventors: Jason Wersland, Manhattan Beach, CA (US); Michael Waldron, Dunnington (GB); Geert Ensing, Shanghai (CN); Dennis Colonello, Beverly Hills, CA (US); Benjamin Nazarian, Los Angeles, CA (US)

(73) Assignee: THERAGUN, INC., Beverly Hills, CA (US)

( * ) Notice: Subject to any disclaimer, the term of this patent is extended or adjusted under 35 U.S.C. 154(b) by 468 days.

(21) Appl. No.: 15/647,050

(22) Filed: Jul. 11, 2017

(65) Prior Publication Data
US 2019/0017528 A1   Jan. 17, 2019

(51) Int. Cl.
*A61H 23/00*   (2006.01)
*F16B 7/04*   (2006.01)
*F16B 39/28*   (2006.01)
*F16B 7/18*   (2006.01)
*A61H 1/00*   (2006.01)
(Continued)

(52) U.S. Cl.
CPC ............. *F16B 7/042* (2013.01); *A61H 1/008* (2013.01); *A61H 23/00* (2013.01); *A61H 23/006* (2013.01); *F16B 7/187* (2013.01); *F16B 21/086* (2013.01); *F16B 21/12* (2013.01); *F16B 21/186* (2013.01); *F16B 39/28* (2013.01); *A61H 2201/1207* (2013.01); *A61H 2201/1215* (2013.01); *A61H 2201/169* (2013.01);
(Continued)

(58) Field of Classification Search
CPC . A61H 1/008; A61H 2201/1215; F16B 7/042; F16B 7/187; F16B 39/28; F16B 2/16; F16B 21/165; Y10T 403/4637; Y10T 403/4694; Y10T 403/592; Y10T 403/604
USPC ......... 403/243, 263, 322.1, 330, 322, 322.2, 403/335, 336, 337, 328
See application file for complete search history.

(56) References Cited

U.S. PATENT DOCUMENTS 2,391,671 A   12/1945   Berg
2,475,861 A   7/1949   Thalmann
(Continued)

OTHER PUBLICATIONS

International Search Report and Written Opinion for PCT/US2018/039599.
(Continued)

*Primary Examiner* — Daniel J Wiley
(74) *Attorney, Agent, or Firm* — Jeffer Mangels; Butler & Mitchell LLP; Brennan C. Swain, Esq.

(57) ABSTRACT

A treatment assembly for securing a treatment member to a shaft that includes the treatment member and a female attachment member. The treatment member defines a longitudinal axis, and has a distal end and a proximal end. The proximal end includes an attachment recess defined therein. The female attachment member has a distal end, a proximal end, and a shaft recess defined in the proximal end. The female attachment member is secured in the attachment recess of the treatment member. The shaft recess is defined by an interior surface that includes a first flat surface. The interior surface includes a first detent defined therein. When the shaft is received in the shaft recess, the first flat surface is operatively engaged with a first opposing flat surface on a male attachment member and a first ball is biased into the first detent.

7 Claims, 9 Drawing Sheets (51) Int. Cl.
 *F16B 21/08* (2006.01)
 *F16B 21/12* (2006.01)
 *F16B 21/18* (2006.01)
 *F16B 1/00* (2006.01)

(52) U.S. Cl.
 CPC ............... *A61H 2201/1669* (2013.01); *A61H 2201/1685* (2013.01); *F16B 2001/0035* (2013.01)

(56) References Cited

U.S. PATENT DOCUMENTS

| | | |
|---|---|---|
| 3,172,675 A | 3/1965 | Gonzalez |
| 5,103,809 A | 4/1992 | Deluca |
| 6,006,631 A | 12/1999 | Miner |
| 6,245,031 B1 | 6/2001 | Pearson |
| 7,740,249 B1 | 6/2010 | Gao |
| 2005/0075591 A1 | 4/2005 | Hafemann |
| 2005/0131461 A1 | 6/2005 | Tucek |
| 2014/0101872 A1 | 4/2014 | Utsch |

OTHER PUBLICATIONS

PCT/US18/040795 International Search Report and Written Opinion dated Sep. 24, 2018.

TREATMENT ELEMENT ATTACHMENT SYSTEM

FIELD OF THE INVENTION

The present invention relates generally to a system for attaching a treatment element to a reciprocal treatment device.

BACKGROUND OF THE INVENTION

Therapeutic treatment or massage devices may include interchangeable treatment devices. However, the mechanism for changing the components may be complicated. Furthermore, due to the vibrations of the device, the components may come loose during use. Accordingly, a need exists for a system that overcomes these issues.

SUMMARY OF THE PREFERRED EMBODIMENTS

In accordance with a first aspect of the present invention there is provided a treatment assembly for securing a treatment member to a shaft that includes the treatment member and a female attachment member. The treatment member defines a longitudinal axis, and has a distal end and a proximal end. The proximal end includes an attachment recess defined therein. The female attachment member has a distal end, a proximal end, and a shaft recess defined in the proximal end. The female attachment member is secured in the attachment recess of the treatment member. The shaft recess is defined by an interior surface that includes a first flat surface. The interior surface includes a first detent defined therein. When the shaft is received in the shaft recess, the first flat surface is operatively engaged with a first opposing flat surface on a male attachment member and a first ball is biased into the first detent. Preferably, the first detent is defined in the first flat surface.

In a preferred embodiment, the interior surface includes a second flat surface, and a second detent defined therein. When the shaft is received in the shaft recess, the second flat surface is operatively engaged with a second opposing flat surface on the male attachment member and a second ball is biased into the second detent. Preferably, the first detent is defined in the first flat surface and the second detent is defined in the second flat surface. In a preferred embodiment, the first and second flat surfaces of the female attachment member are substantially parallel to one another.

In accordance with another aspect of the present invention there is provided an attachment system for securing a treatment member to a shaft. The attachment system includes the treatment member, a female attachment member and a male attachment member. The treatment member defines a longitudinal axis and has a distal end and a proximal end. The proximal end includes an attachment recess defined therein. The female attachment member has a distal end, a proximal end, and a shaft recess defined in the proximal end. The female attachment member is secured in the attachment recess of the treatment member. The shaft recess is defined by an interior surface that includes a first flat surface. The interior surface includes one of a first detent defined therein or a first ball biased therefrom. The male attachment member is disposed in the shaft recess and includes an exterior surface with at least a first opposing flat surface. The exterior surface includes the other of a first detent defined therein or a first ball biased therefrom. The first flat surface is operatively engaged with the first opposing flat surface and the first ball is biased into the first detent.

In a preferred embodiment, the first detent is defined in the inner surface of the shaft recess and the first ball is biased outwardly from the exterior surface of the male attachment member. Preferably, the first detent is defined in the first flat surface. In a preferred embodiment, the interior surface of the female attachment member includes a second flat surface and a second detent defined therein. The exterior surface of the male attachment member includes a second opposing flat surface and a second ball biased outwardly therefrom, and the second flat surface is operatively engaged with the opposing second flat surface on the male attachment member and the second ball is biased into the second detent. Preferably, the first detent is defined in the first flat surface, the second detent is defined in the second flat surface, the first ball is biased outwardly from the first opposing flat surface and the second ball is biased outwardly from the second opposing flat surface. In a preferred embodiment, the first and second flat surfaces of the female attachment member are substantially parallel to one another and the first and second opposing flat surfaces of the male attachment member are substantially parallel to one another.

In accordance with another aspect of the present invention there is provided an attachment system for securing a treatment member to a shaft. The attachment system includes the treatment member, a female attachment member, a disc and a male attachment member. The treatment member defines a longitudinal axis and has a distal end and a proximal end. The proximal end includes an attachment recess defined therein. The female attachment member has a distal end, a proximal end, and a shaft recess defined in the proximal end. The female attachment member is secured in the attachment recess of the treatment member. The shaft recess is defined by an interior surface that includes a first flat surface. The female attachment member includes at least one spring biased ball extending upwardly therefrom. The male attachment member is disposed in the shaft recess and includes at least one securing protrusion extending upwardly therefrom. The disc is positioned above the male attachment member and includes at least one securing opening defined therein. The securing protrusion is received in the securing opening. The disc includes at least one detent defined therein and the spring biased ball is received in the detent.

In a preferred embodiment, the male attachment member includes a plurality of circularly arranged securing protrusions extending upwardly therefrom and the disc includes a plurality of circularly arranged securing openings defined therein that receive the securing protrusions. Preferably, the female attachment member includes at least two spring biased balls extending upwardly therefrom. The disc includes more than two detents defined therein, and the detents are arranged circularly. In a preferred embodiment, the male attachment member includes exterior threads and the female attachment member includes interior threads. Preferably, the shaft extends through central openings in the disc and the male attachment member.

In accordance with another aspect of the present invention there is provided a method of attaching the treatment assembly to the male attachment member. The method includes inserting and threading the male attachment member into the shaft opening of the female attachment member, pushing the spring biased ball inwardly or downwardly with the bottom surface of the disc, rotating the treatment assembly until the spring biased ball is biased upwardly into the detent.

In accordance with another aspect of the present invention there is provided a treatment assembly for securing a treatment member to a shaft. The treatment assembly includes the treatment member, which defines a longitudinal axis and has a distal end and a proximal end. The proximal end includes an attachment recess defined therein. A magnet is disposed within the attachment recess, such that when the shaft is received in the attachment recess a distal end of the shaft is magnetically attracted to the magnet. In a preferred embodiment, the attachment system further includes a female attachment member having a distal end, a proximal end, and a shaft recess defined in the proximal end, wherein the female attachment member is secured in the attachment recess of the treatment member, wherein the magnet is secured within the female attachment member and is communicated with the shaft recess, whereby when the shaft is received in the shaft recess, the distal end of the shaft is magnetically attracted to the magnet. In a preferred embodiment, the magnet recess is defined in the distal end of the female attachment member, wherein the magnet is secured in the magnet recess, and wherein an opening is defined between the magnet recess in the shaft recess to communicate the shaft recess and the magnet. Preferably, the female attachment member is internally threaded, and wherein the shaft includes external threads for mating with the female attachment member.

In a preferred embodiment, the shaft extends through a male attachment member that is secured thereto and the external threads are located on the male attachment member. Preferably, the female attachment member includes an annular flange protruding outwardly from an outer surface thereof, the treatment member includes an annular groove defined in an inner surface thereof, and the annular flange is received in the annular groove. Preferably, the annular flange is located radially outwardly from the magnet. In a preferred embodiment, the treatment member includes an annular ridge protruding inwardly from the inner surface thereof, the female attachment member includes an annular groove defined in the outer surface thereof, and the annular ridge is received in the annular groove.

In a preferred embodiment, the treatment member includes a compressible portion disposed between the distal end and the proximal end and the treatment member is hollow.

The attachment system can be used, for example, with the reciprocal treatment devices taught in U.S. Patent Publication Nos. 2016/0367425 and 2017/0027798, and U.S. patent application Ser. No. 15/458,920, filed Mar. 14, 2017, the entireties of which are incorporated by reference herein.

BRIEF DESCRIPTION OF THE DRAWINGS

Like numerals refer to like parts throughout the several views of the drawings.

DETAILED DESCRIPTION OF THE PREFERRED EMBODIMENTS

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments.

Reference in this specification to "one embodiment" or "an embodiment" means that a particular feature, structure, or characteristic described in connection with the embodiment is included in at least one embodiment of the—disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted.

It will be appreciated that the same thing can be said in more than one way. Consequently, alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," "aft," "forward," "inboard," "outboard" and "below" used herein are merely for ease of description and refer to the orientation of the components as shown in the figures. It should be understood that any orientation of the components described herein is within the scope of the present invention.

Referring now to the drawings, wherein the showings are for purposes of illustrating the present invention and not for purposes of limiting the same, FIGS. 1-4 show an attachment system 10 in accordance with a preferred embodiment of the present invention. In a preferred embodiment, the attachment system 10 is used to secure a treatment element or member to the shaft of a reciprocal treatment device that is used for massage or therapeutic treatment. However, this is not a limitation on the present invention and it will be appreciated by those of ordinary skill in the art that the attachment system can be used for attaching any removable or replaceable component to the distal end of the shaft. Accordingly, as used herein, the term treatment device, treatment element or treatment assembly refers to any component that can be removably replaced on the end of the shaft and is not limited to a massage treatment element.

Figure 1:
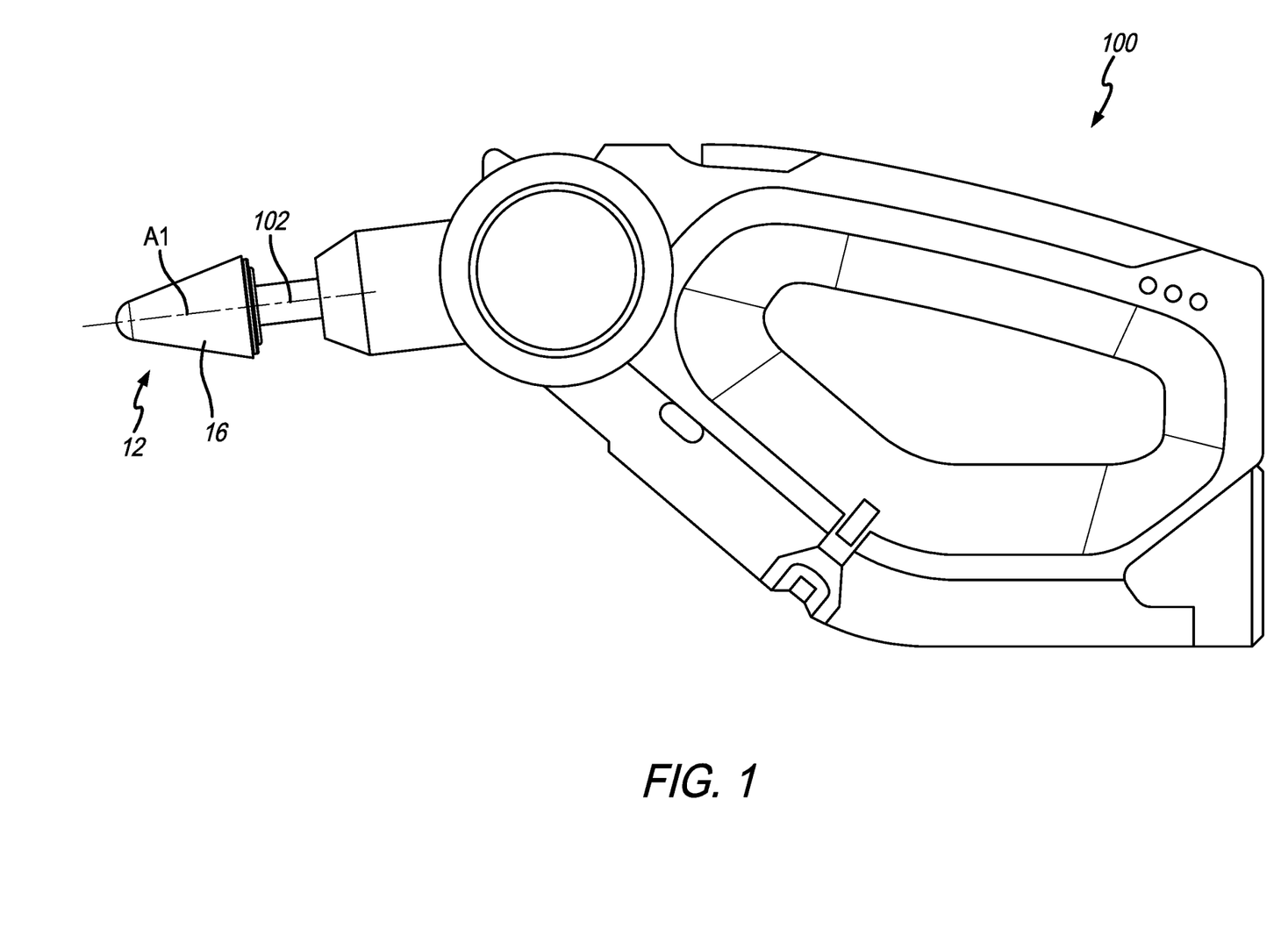
FIG. 1 is an elevational view of a reciprocal treatment device with a treatment member attached thereto via an attachment system in accordance with a preferred embodiment of the present invention.
Figure 2:
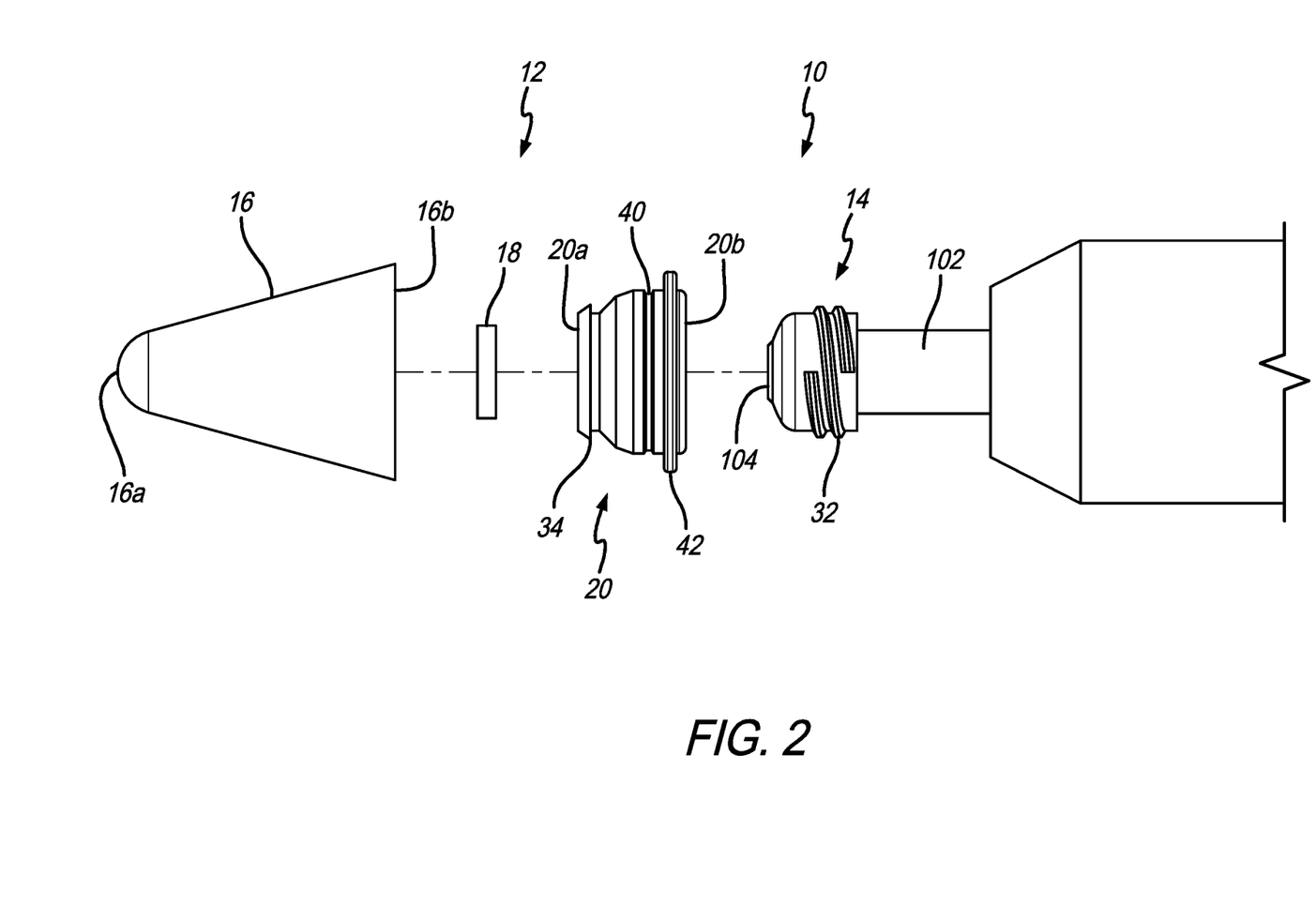
FIG. 2 is an exploded elevational view of the attachment system of FIG. 1.
Figure 3:
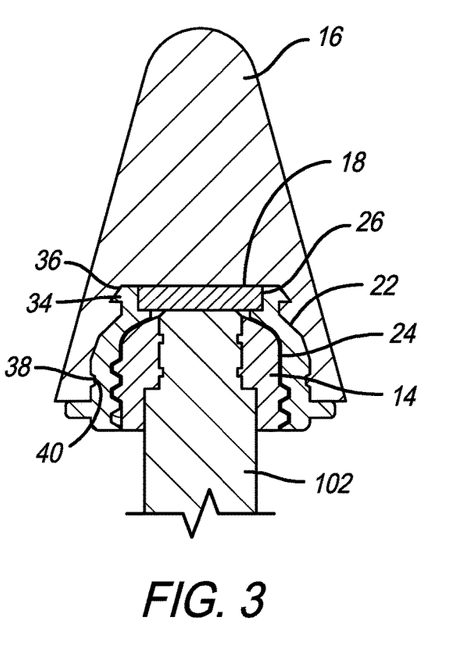
FIG. 3 is a cross-sectional elevational view of the treatment member attached to the shaft of the reciprocal treatment device using the attachment system.
Figure 4:
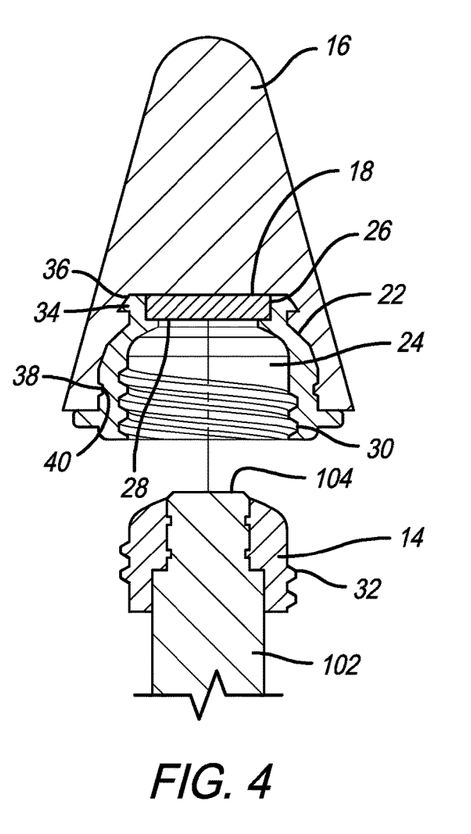
FIG. 4 is a cross-sectional elevational view of the treatment member unattached to the shaft of the reciprocal treatment device.

FIG. 1 shows an exemplary reciprocal treatment device 100 having a shaft 102 that reciprocates in a linear motion. The shaft includes a treatment assembly 12 attached to the distal end 104 thereof by an attachment system 10. Details of the attachment system 10 are shown in FIGS. 2-4. As shown in FIG. 2, in a preferred embodiment, the attachment system 10 generally includes the treatment assembly 12 and a male attachment member 14 that is configured to be attached to the shaft 102.

As shown in FIGS. 2-4, the treatment assembly 12 generally includes a treatment member 16 that defines a longitudinal axis A1 (see FIG. 1), a magnet 18 and a female attachment member 20. The treatment member 16 includes a distal end 16a and a proximal end 16b with an attachment recess 22 defined therein. The female attachment member 20 includes a distal end 20a and a proximal end 20b and is secured in the attachment recess 22. The female attachment member 20 preferably includes a shaft recess 24 defined adjacent the proximal end 20b and a magnet recess 26 defined adjacent the distal end 20a. In a preferred embodiment, the female attachment member 20 is made of a plastic and the treatment member 16 is made of made of an elastomeric or compliant material (e.g., rubber, foam, silicone, plastic, PVC). In another embodiment the treatment member 16 and/or the female attachment member can be made of metal, a fabric or any other material. The treatment member can also be hollow (like a tennis ball).

In a preferred embodiment, the magnet 18 is disposed within the magnet recess 26 and is communicated with the shaft recess 24 by a magnet opening 28. As is further described below, when the shaft 102 is received in the shaft recess 24, the distal end 104 of the shaft 102 is magnetically attracted to the magnet 18. In an exemplary embodiment, the magnet 18 has a diameter of about 15 mm and a thickness of about 3 mm, with a pull rating of about 3.24 kg. However, this is only exemplary. The magnet can be any desired size. In another embodiment, a magnet can also be included in the distal end 104 of the shaft 102 and can interact with magnet 18 in the treatment member 16. In yet another embodiment, the treatment member 16 can include a ferrous metal therein that is attracted to the magnet in the distal end of the shaft.

In a preferred embodiment, the female attachment member 20 includes internal threads 30, and the male attachment member 14 includes external threads 32 for mating with the female attachment member 20. The male attachment member 14 includes a central opening through which the shaft 102 extends. In a preferred embodiment, the distal end 104 of the shaft 102 protrudes (e.g., approximately 1 mm) from the male attachment member 14 and has a chamfered end. This allows the protruding portion of the shaft 102 to extend through the magnet opening 28 and provides for metal on metal contact with the magnet 18. In a preferred embodiment, the male attachment member is made of plastic. However, this is not limiting and the male attachment member can be made of other materials, such as metal, wood, etc. In another embodiment, the male attachment member can be made of metal or the shaft itself can include the external threads for mating with the female attachment member and/or the treatment member.

It will be appreciated by those of ordinary skill in the art that the female attachment member can be secured within the attachment recess in many different ways. In a preferred embodiment, the treatment member 16 is molded around the female attachment member 20. In other embodiments, the female attachment member can be adhered, glued, welded, snap fit, friction fit or any other known method within the treatment member 16. As shown in FIGS. 3 and 4, in a preferred embodiment, the female attachment member 20 and treatment member 16 include complementary grooves and rings or flanges that help secure the female attachment member 20 in the attachment recess 22. In a preferred embodiment, the female attachment member 20 includes an annular flange 34 protruding outwardly from an outer surface thereof and the treatment member 16 includes an annular groove 36 defined in an inner surface thereof. The annular flange 34 is received in the annular groove 36. In preferred embodiment, the annular flange 34 is located radially outwardly from the magnet 18. However, this is not a limitation on the present invention and the annular flange 34 or multiple annular flanges can be located anywhere on the female attachment member 20. In a preferred embodiment, the treatment member includes an annular ridge 38 protruding inwardly from the inner surface thereof and the female attachment member 20 includes an annular groove 40 defined in the outer surface thereof. The annular ridge 38 is received in the annular groove 40, to help secure the female attachment member 20 in the attachment recess 22. The female attachment member 20 can also include an external annular flange 42 that contacts the proximal end 16b of the treatment member 16.

In use, to connect the treatment assembly 12 on the shaft 102, the female attachment member 20 is threaded onto the male attachment member 14 until the distal end 104 of the metal shaft 102 comes into contact with or is closely adjacent to magnet 18. The reciprocal treatment device 100 can then be used to massage the user's body part. To change treatment assemblies, the first treatment assembly is unthreaded from the male attachment member and a second treatment assembly is threaded thereon.

Figure 5:
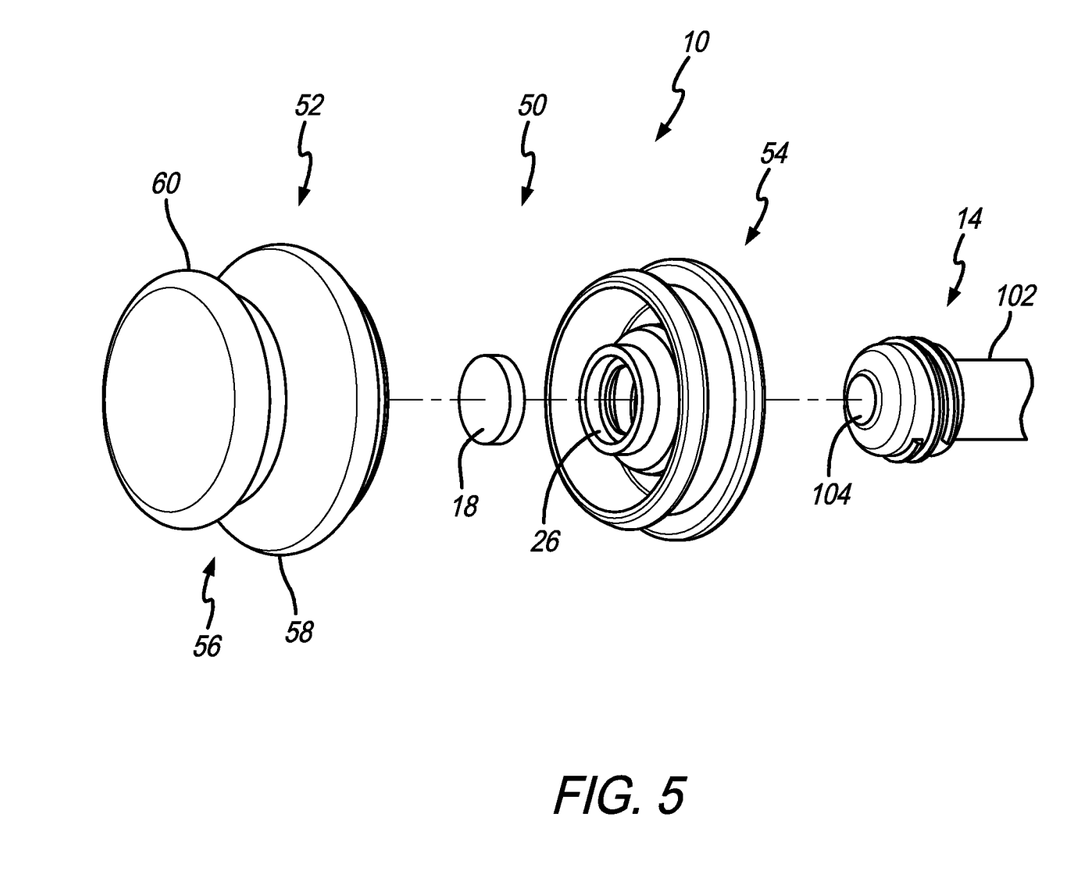
FIG. 5 is an exploded perspective view of a treatment member that includes an attachment system in accordance with another preferred embodiment of the present invention.
Figure 6:
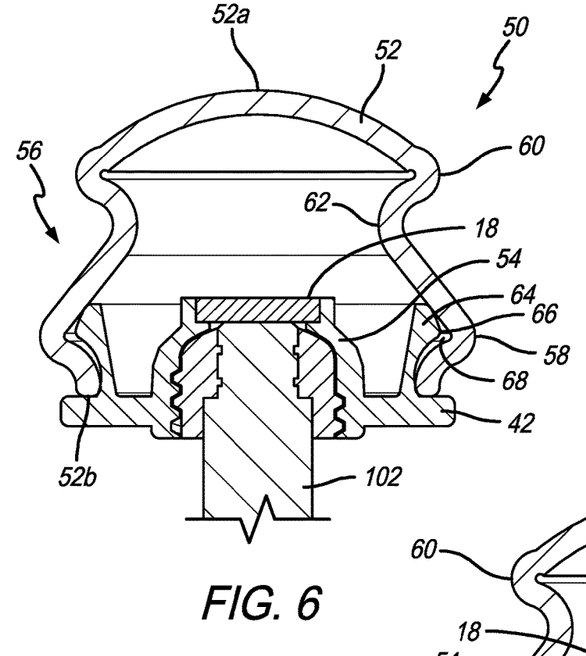
FIG. 6 is a cross-sectional elevational view of the treatment member of FIG. 5 attached to the shaft of the reciprocal treatment device using the attachment system.
Figure 7:
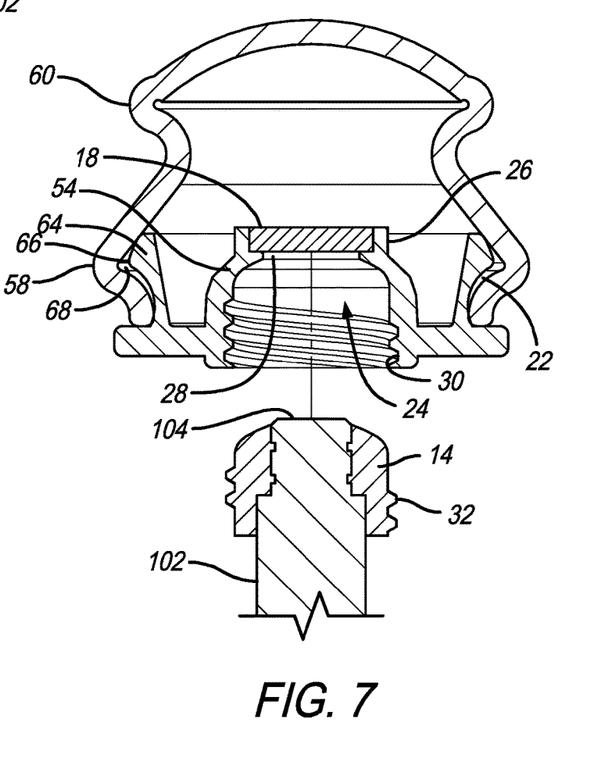
FIG. 7 is a cross-sectional elevational view of the treatment member of FIG. 5 unattached to the shaft of the reciprocal treatment device.

FIGS. 5-7 show another embodiment of a treatment assembly 50 that can be secured to the shaft 102 of a reciprocal treatment device using the attachment system 10. As shown in the drawings, in a preferred embodiment, the treatment assembly 50 includes similar components to the treatment assembly described above, but includes a differently shaped treatment member 52 and female attachment member 54. Preferably, the treatment member 52 is made of an elastomeric or compliant material (e.g., rubber, silicone), is generally hollow, and includes a compressible portion 56 between the distal and proximal ends 52a and 52b. With this arrangement, during use, the treatment member compresses or collapses, thereby providing a softer impact than the treatment member 16 described above.

As shown in FIGS. 5-7, the treatment member 52 includes a first annular outwardly protruding portion 58, a second annular outwardly protruding portion 60 and the compressible portion 56 disposed therebetween. In preferred embodiment, the second annular outwardly protruding portion 60 has a larger diameter than the first annular outwardly protruding portion 58. The compressible portion 56 also includes an annular inwardly protruding portion 62. The compressible portion 56 first annular outwardly protruding portion 58, second annular outwardly protruding portion 60 and annular inwardly protruding portion 62 all work together to provide compression and spring back of the treatment member 52 during use. In other words it has a spring like action that absorbs some of the impact to the body or subject of the treatment.

The female attachment member 54 preferably includes an annular collar 64 that interacts with the inner surface of the treatment member 52 to secure the two components together. The annular collar 64 includes a ridge 66 thereon that is received in a trough 68 created by the first annular outwardly protruding portion 58. It will be appreciated that the hollow compressible treatment member 52 can be used with any of the attachment systems taught herein and shown in any of the drawings. In other words, the hollow compressible treatment member 52 is not limited to the magnet attachment system, but can also be used with the attachment systems shown in FIGS. 8-13 below.

Figure 8:
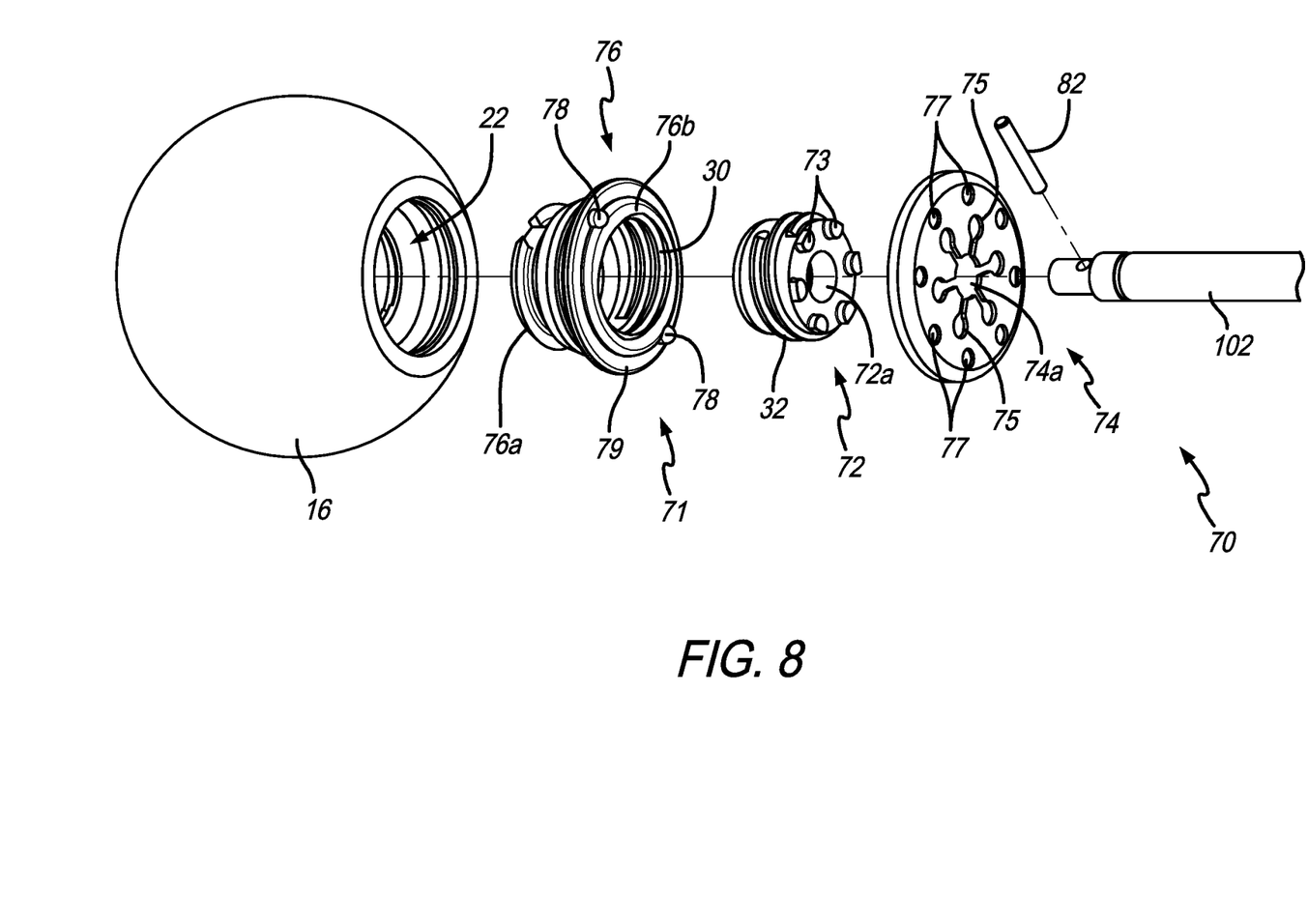
FIG. 8 is an exploded perspective view of a treatment member that includes an attachment system in accordance with another preferred embodiment of the present invention.
Figure 9:
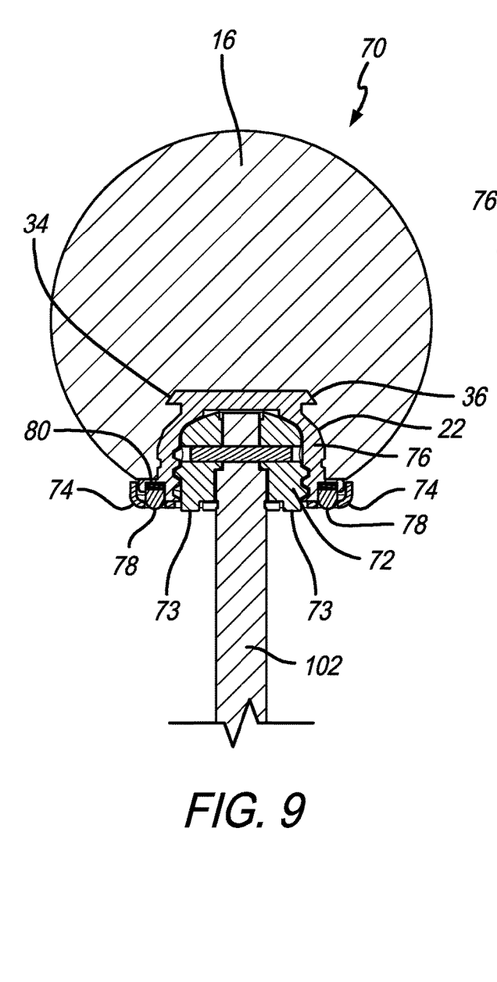
FIG. 9 is a cross-sectional elevational view of the treatment member of FIG. 8 attached to the shaft of the reciprocal treatment device using the attachment system.
Figure 10:
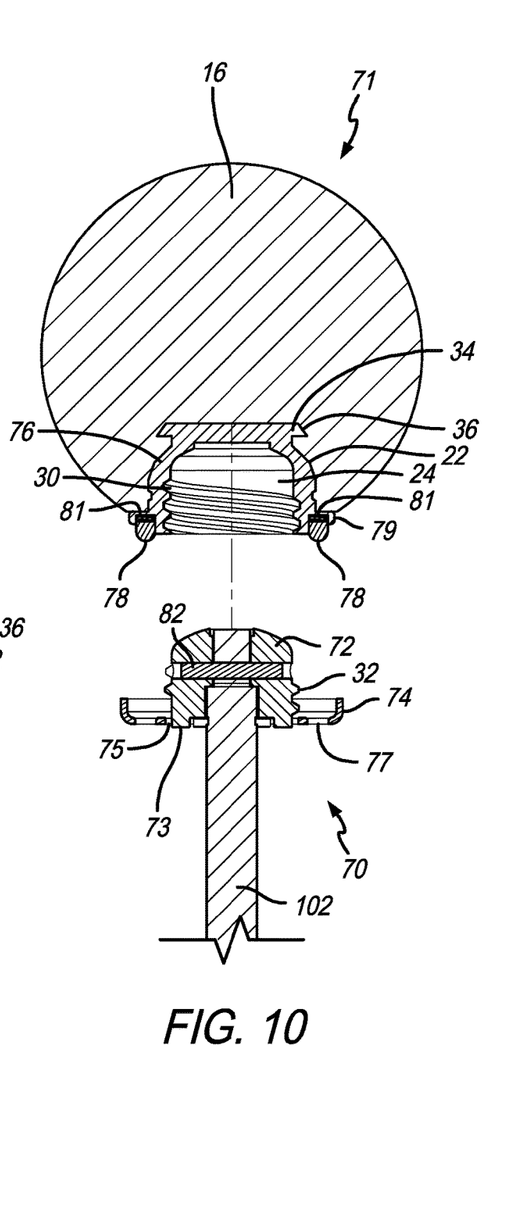
FIG. 10 is a cross-sectional elevational view of the treatment member of FIG. 8 unattached to the shaft of the reciprocal treatment device.

FIGS. 8-10 show another embodiment of an attachment system 70 that can be used with a reciprocal treatment device. As shown in FIG. 8, in a preferred embodiment, the attachment system 70 generally includes a treatment assembly 71, a male attachment member 72, and a disc 74. The male attachment member 72 and disc 74 both include central openings 72a and 74a and are configured to be attached to the shaft 102. Preferably, the male attachment member 72 includes at least one and preferably a plurality of circularly arranged securing protrusions 73 extending upwardly therefrom that are received in circularly arranged securing openings 75 defined in the disc 74 (see FIGS. 9-10). It will be appreciated that there can be a single securing opening 75 and a single securing protrusion 73. Furthermore, "circularly arranged" can include two or more securing protrusions 73 and securing openings 75 arranged around the male attachment member 72 and disc 74. The combination of the securing protrusions 73 and securing openings 75 prevent the male attachment member 72 and disc 74 from rotating with respect to one another when securing the treatment assembly 71 thereon, as described below. In a preferred embodiment, the disc also includes at least one and preferably a plurality of intersecting shaft channels defined therein that each extend between opposing securing openings 75 and through the central opening 74a of the disc. The shaft channels allow the shaft 82 to pass therethrough when assembling the disc 74 onto the shaft 102.

In a preferred embodiment, the treatment assembly 71 generally includes a treatment member 16, and a female attachment member 76. The treatment member 16 includes a distal end 16a and a proximal end 16b with an attachment recess 22 defined therein. The female attachment member 76 includes a distal end 76a and a proximal end 76b and is secured in the attachment recess 22. The female attachment member 76 preferably includes a shaft recess 24 defined adjacent the proximal end thereof.

In a preferred embodiment, the female attachment member 76 includes at least one and preferably a plurality (two are shown in the drawings) of spring biased balls 78 or plungers that cooperate with openings or detents 77 defined in the disc 74 or in the male attachment member 72, as described below. Preferably, the female attachment member 76 includes an annular flange 79 extending outwardly from the main body portion that includes recesses 80 in which the balls 78 are seated. The recesses 80 can include a spring 81 or any other type of biasing mechanism that biases the balls 78 outwardly or upwardly.

In a preferred embodiment, the female attachment member 76 includes internal threads 30, and the male attachment member 72 includes external threads 32 for mating with the female attachment member 76. In use, to connect the treatment assembly 71 on the shaft 102, the female attachment member 76 is threaded onto the male attachment member 72 until the balls 78 are received and biased into the detents 77, as shown in FIG. 9. The reciprocal treatment device 100 can then be used to massage the user's body part. To change treatment assemblies, the first treatment assembly is unthreaded from the male attachment member and a second treatment assembly is threaded thereon. It will be appreciated by those of ordinary skill in the art that the springs 81 are chosen with the appropriate spring force so that the balls 78 are biased with enough outward force to keep them in the detents 77 during use of the reciprocal treatment device (to prevent rotation and accidental separation of the treatment assembly 71 from the shaft), but, when the treatment assembly 71 is unthreaded, due to the curved surface of the balls 78, the edges of the detents 77 push the balls 78 inwardly so that they come out of the detents 77 and the treatment assembly 71 can be removed from the shaft.

In a preferred embodiment, the male attachment member 72 and shaft 102 include transverse openings defined therethrough that receive a shaft 82 that secures the male attachment member 72 on the shaft 102. In another embodiment, the male attachment member 72 can be secured to the shaft 102 as described above in the first embodiment or by any other method (glue, welding, adhesive, threading, etc.). A magnet can also be included in this embodiment, if desired.

Figure 11:
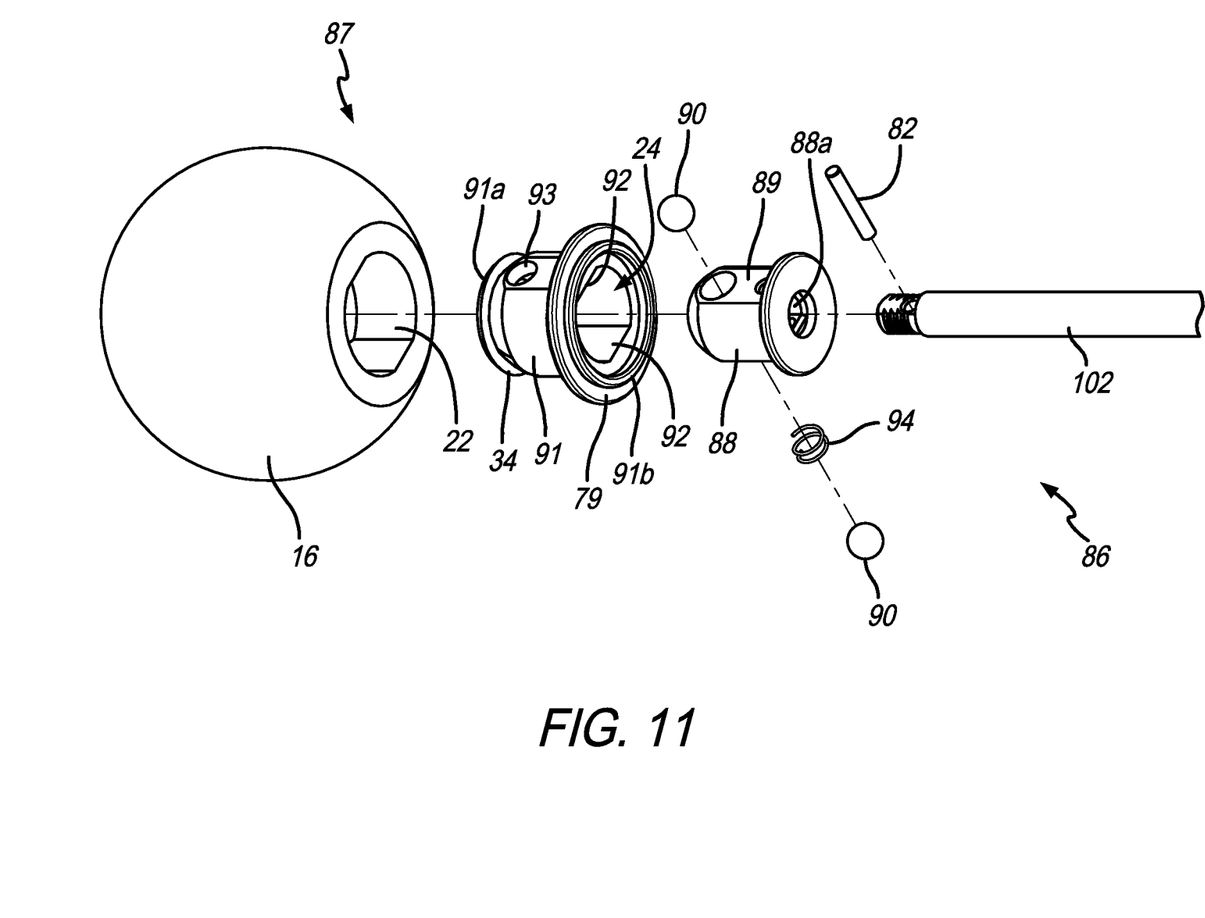
FIG. 11 is an exploded perspective view of a treatment member that includes an attachment system in accordance with another preferred embodiment of the present invention.
Figure 12:
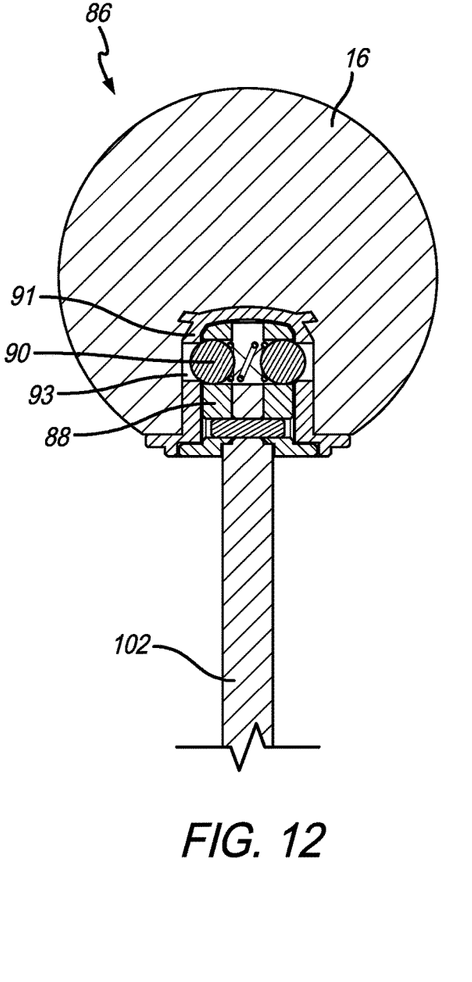
FIG. 12 is a cross-sectional elevational view of the treatment member of FIG. 11 attached to the shaft of the reciprocal treatment device using the attachment system.
Figure 13:
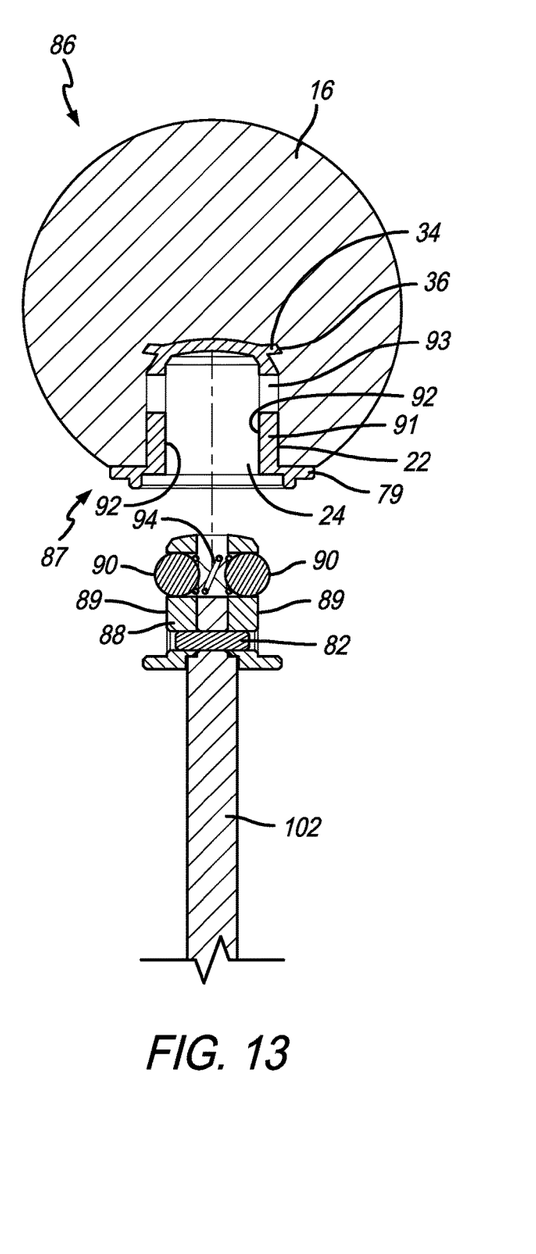
FIG. 13 is a cross-sectional elevational view of the treatment member of FIG. 11 unattached to the shaft of the reciprocal treatment device.

FIGS. 11-13 show another embodiment of an attachment system 86 that can be used with a reciprocal treatment device. As shown in FIG. 11, in a preferred embodiment, the attachment system 86 generally includes a treatment assembly 87, and a male attachment member 88. The male attachment member 88 includes a shaft recess or central opening 88a and is configured to be attached to the shaft 102. Preferably, the male attachment member 88 is generally round, but includes first and second opposing flat surfaces 89 on opposite sides thereof (a single flat surface is within the scope of the present invention). The male attachment member also includes balls 90 that are spring biased outwardly from the opposing flat surfaces 89. Any biasing mechanism is within the scope of the present invention. In a preferred embodiment, one or more springs 94 bias the balls 90 outwardly.

In a preferred embodiment, the treatment assembly 87 generally includes a treatment member 16, and a female attachment member 91. The treatment member 16 includes a distal end 16a and a proximal end 16b with an attachment recess 22 defined therein. The female attachment member 91 includes a distal end 91a and a proximal end 91b and is secured in the attachment recess 22. The female attachment member 91 preferably includes a shaft recess 24 defined adjacent the proximal end thereof. The female shaft recess includes first and second flat surfaces 92 that have detents 93 defined therein. The balls 90 on the male attachment member 88 are configured to be received in and cooperate with the detents in the female attachment member 91. Furthermore, the first and second opposing flat surfaces 89 of the male attachment member 88 are configured to cooperate with the first and second flat surfaces 92 of the female attachment member 91 to prevent the two from rotating with respect to one another. In another embodiment, the interior surface of the female attachment and the exterior surface of the male attachment member can be square or rectangular or include other shapes that allow the female attachment member and male attachment member to mate and be prevented from rotating with respect to one another. It will be appreciated by those of ordinary skill in the art that a single flat surface on each will prevent rotation.

To change treatment assemblies, the first treatment assembly is pulled axially off of the male attachment member and a second treatment assembly is placed on the male attachment member. It will be appreciated by those of ordinary skill in the art that the spring(s) 94 are chosen with the appropriate spring force so that the balls 90 are biased with enough outward force to keep them in the detents 93 during use of the reciprocal treatment device, but, when the treatment assembly 87 is pulled outwardly (away from the shaft in an axial direction), due to the curved surface of the balls 90, the edges of the detents 93 push the balls 90 inwardly so that they come out of the detents 93 and the treatment assembly 87 can be removed from the shaft.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers or dimensions noted herein are only examples: alternative implementations may employ differing values, measurements, dimensions or ranges.

The teachings of the disclosure provided herein can be applied to other systems, not necessarily the system described above. The elements and acts of the various embodiments described above can be combined to provide further embodiments. Any measurements described or used herein are merely exemplary and not a limitation on the present invention. Other measurements can be used. Further, any specific materials noted herein are only examples: alternative implementations may employ differing materials.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A treatment assembly for securing a treatment member to a shaft, the treatment assembly comprising:
   the treatment member, wherein the treatment member defines a longitudinal axis and has a distal end and a proximal end, wherein the proximal end includes an attachment recess defined therein,
   a female attachment member having a distal end, a proximal end, and a shaft recess defined in the proximal end, wherein the female attachment member is secured in the attachment recess of the treatment member, wherein the shaft recess is defined by an interior surface that includes first and second opposing flat surfaces, wherein the first flat surface includes a first detent defined therein and the second flat surface includes a second detent defined therein, whereby when the shaft is received in the shaft recess, the first flat surface is operatively engaged with a first opposing flat surface on a male attachment member and a first ball is biased into the first detent and the second flat surface is operatively engaged with a second opposing flat surface on a male attachment member and a second ball is biased into the second detent.

2. The treatment assembly of claim 1 wherein the interior surface includes first and second opposing curved surfaces.

3. The treatment assembly of claim 2 wherein the first and second flat surfaces of the female attachment member are substantially parallel to one another.

4. An attachment system for securing a treatment member to a shaft, the attachment system comprising:
the treatment member, wherein the treatment member defines a longitudinal axis and has a distal end and a proximal end, wherein the proximal end includes an attachment recess defined therein,
a female attachment member having a distal end, a proximal end, and a shaft recess defined in the proximal end, wherein the female attachment member is secured in the attachment recess of the treatment member, wherein the shaft recess is defined by an interior surface that includes first and second opposing flat surfaces, wherein the first flat surface includes a first detent defined therein and the second flat surface includes a second detent defined therein,
a male attachment member disposed in the shaft recess, wherein the male attachment member includes an exterior surface with first and second opposing flat surfaces, wherein a first ball is biased outwardly from the first flat surface and a second ball is biased outwardly from the second flat surface,
wherein the first flat surface of the female attachment member is operatively engaged with the first flat surface of the male attachment member and the first ball is biased into the first detent, and wherein the second flat surface of the female attachment member is operatively engaged with the second flat surface of the male attachment member and the second ball is biased into the second detent.

5. The attachment system of claim 4 wherein the interior surface of the female attachment member includes first and second opposing curved surfaces, wherein the exterior surface of the male attachment member includes first and second opposing curved surfaces.

6. The attachment system of claim 5 wherein the first and second flat surfaces of the female attachment member are substantially parallel to one another and the first and second opposing flat surfaces of the male attachment member are substantially parallel to one another.

7. The attachment system of claim 6 wherein the male attachment member includes an inclined surface on a distal end thereof.

* * * * *